United States Patent [19]

Uehara

[11] Patent Number: 5,059,842
[45] Date of Patent: Oct. 22, 1991

[54] ELECTROMAGNETIC CLUTCH WITH GROOVED FRICTION SURFACE

[75] Inventor: Fumiaki Uehara, Sawa, Japan

[73] Assignee: Sanden Corporation, Japan

[21] Appl. No.: 596,492

[22] Filed: Oct. 12, 1990

[30] Foreign Application Priority Data

Oct. 12, 1989 [JP] Japan .................. 1-118775[U]

[51] Int. Cl.$^5$ .................... H02K 7/108; F16D 27/10
[52] U.S. Cl. .................. 310/78; 192/84 C; 192/107 M; 310/256
[58] Field of Search ............... 192/84 C, 107 M; 310/78, 106, 256, 77

[56] References Cited

U.S. PATENT DOCUMENTS

| | | |
|---|---|---|
| 2,650,682 | 1/1949 | Oetzel . |
| 3,044,594 | 7/1962 | Bernard . |
| 3,082,933 | 3/1963 | Bernard . |
| 3,162,285 | 12/1964 | Sala . |
| 3,371,758 | 3/1968 | Stuhlmiller . |
| 3,425,529 | 2/1969 | Hayashi . |
| 3,565,223 | 2/1971 | Pierce . |
| 3,620,339 | 11/1971 | Becking . |
| 4,090,161 | 5/1978 | Fuhrer et al. . |
| 4,227,600 | 10/1980 | Shirai . |
| 4,244,994 | 1/1981 | Trainor et al. . |
| 4,397,380 | 8/1983 | Yew ........................... 310/78 |
| 4,446,203 | 5/1984 | Okubo et al. . |
| 4,741,425 | 5/1988 | Kitano et al. ............. 192/107 M |
| 4,892,176 | 1/1990 | Takashi et al. . |
| 4,973,870 | 11/1990 | Uehara ....................... 310/78 |

FOREIGN PATENT DOCUMENTS

| | | |
|---|---|---|
| 0105789 | 4/1984 | European Pat. Off. . |
| 0154230 | 9/1985 | European Pat. Off. . |
| 179372 | 12/1906 | Fed. Rep. of Germany . |
| 1775272 | 7/1968 | Fed. Rep. of Germany . |
| 321735 | 6/1902 | France . |
| 1102152 | 10/1955 | France . |
| 1102413 | 10/1955 | France .................. 192/84 C |
| 52-151258 | 11/1977 | Japan . |
| 58-98659 | 6/1983 | Japan . |
| 59-151628 | 8/1984 | Japan . |
| 62-149629 | 9/1987 | Japan . |
| 966750 | 8/1964 | United Kingdom . |
| 1078749 | 8/1967 | United Kingdom . |
| 1277868 | 6/1972 | United Kingdom . |

Primary Examiner—Steven L. Stephan
Assistant Examiner—D. L. Rebsch
Attorney, Agent, or Firm—Banner, Birch, McKie & Beckett

[57] ABSTRACT

An electromagnetic clutch includes a clutch rotor having a first friction surface and an annular armature plate having a second friction surface. The first friction surface and the second friction surface face each other. A friction member made of nonmagnetic material is fixedly disposed within a second groove formed at the second friction surface of the annular armature plate. A first end surface of the friction member projects with respect to the second friction surface of the annular armature plate. The first friction surface of the clutch rotor is provided with a first annular groove to receive the projecting portion of the friction member. Therefore, the depth of the second groove becomes smaller. Consequently, the number of magnetic lines of flux which radially penetrate through an annular portion of the annular armature plate at the location of the second groove is enhanced. Thus, the magnetic attraction between the annular armature plate and the clutch rotor is increased without increasing the weight of the electromagnetic clutch.

9 Claims, 2 Drawing Sheets

ELECTROMAGNETIC CLUTCH WITH GROOVED FRICTION SURFACE

BACKGROUND OF THE INVENTION

1. Field of the Invention

This invention generally relates to an electromagnetic clutch, such as for use in controlling the transmission of power from an automobile engine to a refrigerant compressor in an automobile air conditioning system. More particularly, this invention relates to the transmission of power from the automobile engine to a friction surface of the electromagnetic clutch.

2. Description of The Prior Art

An embodiment of Japanese Utility Model Application Publication No. 52-151258 is essentially illustrated in FIG. 1. Electromagnetic clutch 10' is intended to be coupled to a refrigerant compressor in an automobile air conditioning system. Compressor housing 11 is provided with cantilevered tubular extension 12 surrounding an extension of drive shaft 13 of the refrigerant compressor. Drive shaft 13 is rotatably supported in compressor housing 11 by bearings (not shown). The X-axis is the horizontal axis about which hub 24, annular armature plate 26, and clutch rotor 15 rotate.

Clutch rotor 15 is rotatably supported on cantilevered tubular extension 12 through bearing 16. Bearing 16 is mounted on the outer surface of cantilevered tubular extension 12. Clutch rotor 15 is made of a magnetic material, such as steel, and comprises outer annular cylindrical portion 151, inner annular cylindrical portion 152, and axial end plate portion 153. Axial end plate portion 153 connects outer cylindrical portion 151 with inner cylindrical portion 152 at each of their axial forward ends (to the right in FIG. 1). Axial end plate portion 153 includes first friction surface 153a. Annular U-shaped cavity 17 is defined by portions 151, 152 and 153. A plurality of V-shaped grooves 18 are provided on outer peripheral surface of outer annular cylindrical portion 151 for receiving belt 40. Belt 40 couples clutch rotor 15 to the power output of an automobile engine (not shown).

Axial end plate portion 153 includes one or more slits 19 which are disposed on a circle or on concentric circles centered about the X-axis. These slits 19 define a plurality of annular or arcuate magnetic pieces on axial end plate portion 153. The surface of the poles of the magnetic pieces are located on axial end plate portion 153.

Electromagnetic coil 20 is disposed in annular cavity 17 of clutch rotor 15 to supply a magnetic flux, shown by dashed line "M", for attracting annular armature plate 26 to axial end plate portion 153 of clutch rotor 15. Electromagnetic coil 20 is contained within annular magnetic housing 21 which has a U-shaped cross section. The annular magnetic housing 21 is fixed to supporting plate 22, which is secured to the axial forward end surface of compressor housing 11 by a plurality of rivets 221. A small air gap is maintained between annular magnetic housing 21 and clutch rotor 15.

Hub 24 is disposed on the terminal end of drive shaft 13. Hub 24 is secured to drive shaft 13 by nut 25. Hub 24 comprises tubular member 241 secured on the terminal end of drive shaft 13 and flange portion 242 extending radially from the axial end of tubular member 241. Flange portion 242 is integrally formed with tubular member 241. Alternatively, flange portion 242 may be formed separately from tubular member 241 and fixed on tubular member 241 by any known securing method, for example, welding.

Annular armature plate 26 is composed of a magnetic material and is concentric with hub 24. Annular armature plate 26 faces axial end plate portion 153 with predetermined axial air gap "1" in them. Annular armature plate 26 is connected elastically to flange portion 242 of hub 24 through a plurality of leaf springs 27. Annular armature plate 26 includes second friction surface 26a which faces first friction surface 153a which is located on axial end plate portion 153 of clutch rotor 15. Stopper plate 28 and one end of each leaf spring 27 are secured by rivets 29 to outer surface of flange portion 242 through spacing member 30. The other end of each leaf spring 27 is fixed to annular armature plate 26 by rivet 31 so that annular armature plate 26 is flexibly supported for axial movement upon deflection of leaf springs 27.

Thus, when electromagnetic coil 20 is energized, annular armature plate 26 is attracted to axial end plate portion 153 of clutch rotor 15. Consequently, first friction surface 153a and second friction surface 153a engage each other. Drive shaft 13 is then rotated together with clutch rotor 15 through leaf springs 27 and hub 24. The rotation is provided by the engine output.

When electromagnetic coil 20 is not energized, annular armature plate 26 is separated from clutch rotor 15 by the elasticity of leaf springs 27. Clutch rotor 15 is rotated by the engine output, but the refrigerant compressor is not driven.

To enhance the torque transmission from the clutch rotor to the annular armature plate, annular friction member 60', made of a nonmagnetic material, is fixedly disposed within annular groove 26b'. Annular groove 26b' is formed near the radially outermost edge of second friction surface 26a of annular armature plate 26. A first end surface (to the left in FIG. 1) of annular friction member 60' projects slightly with respect to second friction surface 26a of annular armature plate 26. However, the first end surface of annular friction member 60' can be considered to be substantially flush with second friction surface 26a of annular armature plate 26. The thickness of annular friction member 60' is required to be relatively large in order to easily form annular friction member 60'. Therefore, the depth of annular groove 26b' is required to be relatively large and the thickness of annular portion 26c' is decreased. Thus, the magnetic resistance at annular portion 26c' of annular armature plate 26 is increased. Accordingly, the number of magnetic lines of flux which radially penetrate through annular portion 26c' of annular armature plate 26 is decreased, thereby creating the situation where the electromagnetic attraction generated by a unit of electric power becomes smaller.

The above problem can be solved by increasing the thickness of the annular armature plate. However, a serious disadvantage created by this solution is an undesirable increase in the weight of the electromagnetic clutch.

Another disadvantage of electromagnetic clutches in the prior art is that they do not address the reduction of the amount of leakage flux, shown by dotted line "B", at radial outer region 153b of axial end plate portion 153.

SUMMARY OF THE INVENTION

It is an object of this invention to provide an electromagnetic clutch that overcomes the above disadvantages. Namely, it is an object of the present invention to not unnecessarily reduce the number of magnetic lines of flux that radially penetrate through an annular armature plate without increasing the weight of the annular armature plate. Another object of the present invention is to reduce the amount of leakage flux that escapes from the radial outer region of the axial end plate portion.

An electromagnetic clutch includes a first rotatable member, such as a clutch rotor, and a second rotatable member, such as a drive shaft. The first rotatable member is made of a magnetic material and has a first friction surface. An annular armature plate is made of a magnetic material and is joined to the second rotatable member so that the annular armature plate can axially move within a limited range. A second friction surface of the annular armature plate faces the first friction surface of the first rotatable member with an axial air gap in between them. A friction member made of a nonmagnetic material, is fixedly disposed on the second friction surface of the annular armature plate. A first end surface of the friction member faces the first friction surface of the first rotatable member. The first end surface of the friction member is apart from the second friction surface of the annular armature plate with a sufficient distance. The first rotatable member includes a first annular groove formed at the friction surface to receive the friction member.

An electromagnetic device is associated with the first rotatable member for attracting the annular armature plate to the first friction surface of the first rotatable member. Thus, rotation of the first rotatable member can be transmitted to the second rotatable member through the annular armature plate by the operation of the electromagnetic device.

DETAILED DESCRIPTION OF THE PREFERRED EMBODIMENT

Figure 2:
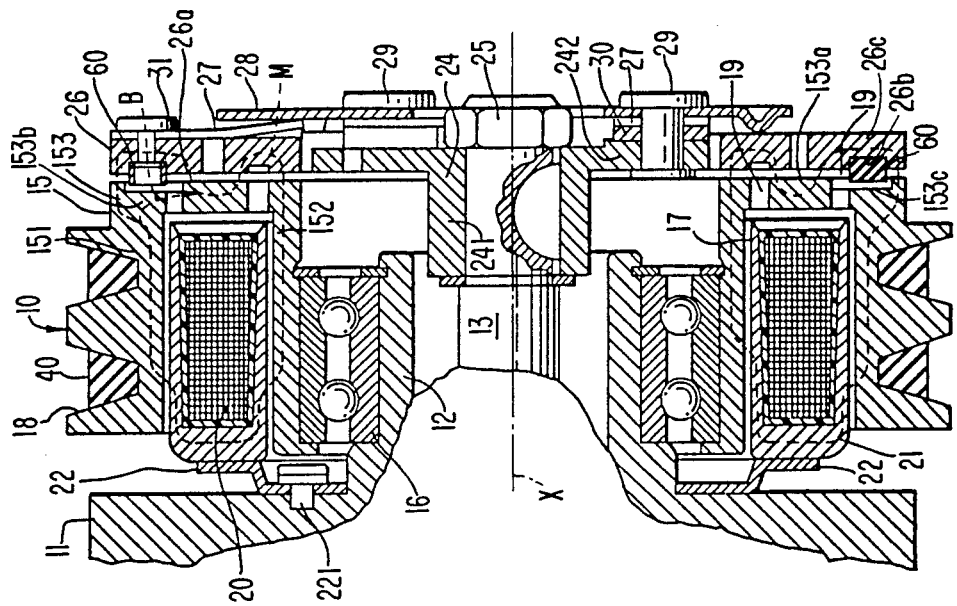
FIG. 2 illustrates a side elevational sectional view of an electromagnetic clutch in accordance with a first embodiment of the present invention.
Figure 1:
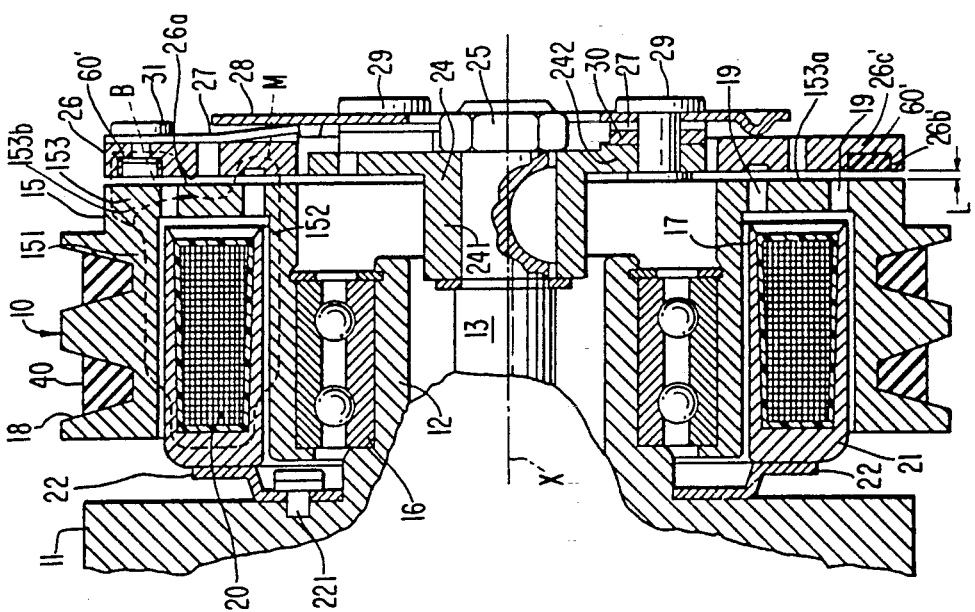
FIG. 1 illustrates a side elevational sectional view of an electromagnetic clutch in accordance with a prior art device.
Figure 3:
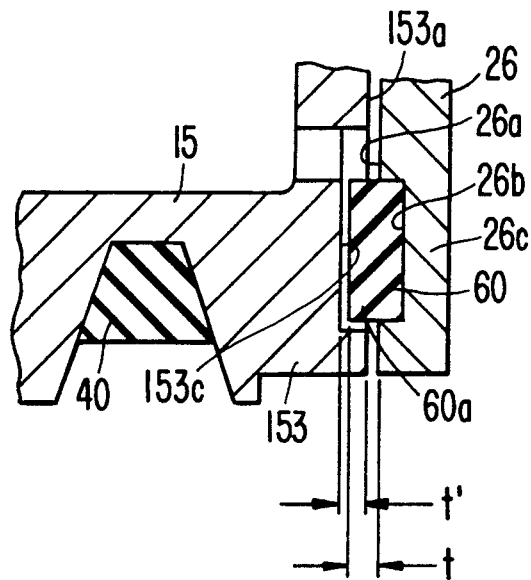
FIG. 3 illustrates a fragmentary sectional view of the electromagnetic clutch shown in FIG. 2.

Referring to FIGS. 2 and 3, electromagnetic clutch 10 is shown in accordance with a first embodiment of the present invention. In FIGS. 2 and 3, the same numerals are used to denote the corresponding elements shown in FIG. 1, thus an explanation thereof is omitted.

Friction member 60 is made of a nonmagnetic material, for example, aromatic polyamide resin fiber (named "Kevlar" as a trademark) in a molded phenol resin. Friction member 60 is fixedly disposed in second groove 26b formed close to the radially outermost edge of second friction surface 26a of annular armature plate 26. A first end surface (to the left in FIGS. 2 and 3) of friction member 60 sufficiently projects with respect to second friction surface 26a of annular armature plate 26. Axial end plate portion 153 of clutch rotor 15 is provide with first annular groove 153c located at radially outer region 153b. First annular groove 153c receives first end portion 60a of friction member 60. Friction member 60 projects with respect to second friction surface 26a of annular armature plate 26. Therefore, the depth of second groove 26b can be designed to be relatively small. Thus, the thickness of annular portion 26c of annular armature plate 26 can be designed to be relatively large even though the thickness of friction member 60 is relatively large.

In this construction, the relationship between distance "t", which is the distance between the first end surface of friction member 60 and second friction surface 26a of annular armature plate 26, and depth "t", which is the depth of first annular groove 153c can be given by the following formula:

$$t > t' \tag{1}$$

Therefore, the first end surface of friction member 60 is sufficiently engaged with a bottom surface of first annular groove 153c, thereby enhancing the torque transmission from clutch rotor 15 to annular armature plate 26.

Furthermore, since the thickness of annular portion 26c of annular armature plate 26 can be designed to be relatively large, magnetic resistance at annular portion 26c of annular armature plate 26 is reduced. Accordingly, the number of magnetic lines of flux which radially penetrates through annular portion 26c of annular armature plate 26 is increased. Thus, a situation is created where the electromagnetic attraction generated by a unit of electric power becomes larger without increasing the weight of annular armature plate 26.

Since first annular groove 153c is formed at radially outer region 153b of axial end plate portion 153, the magnetic resistance at radially outer region 153b of axial end plate 153 is increased. Thereby, the amount of leakage flux "B" is reduced.

Figure 4:
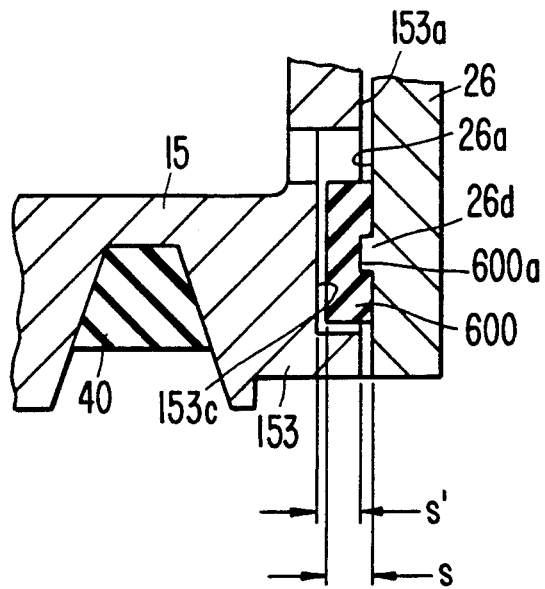
FIG. 4 is a similar view to FIG. 3 illustrating an electromagnetic clutch in accordance with a second embodiment of the present invention.

Referring to FIG. 4 which illustrates a second embodiment of the present invention, annular armature plate 26 is provided with projection 26d which is formed near radially outermost edge of second friction surface 26a of annular armature plate 26. Projection 26d is made to fit with third groove 600a formed at the center of a second end surface (to the right in FIG. 4) of friction member 600. In this embodiment, friction member 600 is fixedly connected to second friction surface 26a of annular armature plate 26 by a forcible insertion of projection 26d of annular armature plate 26 into third groove 600a of friction member 600. The relationship between height "s" of friction member 600 and depth "s" of first annular groove 153c can be given by the following formula.

$$s > s' \tag{2}$$

The effect of the second embodiment is substantially similar to the effect of the first embodiment, in that the number of magnetic lines of flux which radially penetrates through annular portion 26c of annular armature plate 26 is increased. Thus, the electromagnetic attraction generated by a unit of electric power becomes larger without increasing the weight of the annular armature plate. A further effect is the reduction of leakage flux.

Friction member 60, described in the above embodiments, can be annular in shape or may be formed as a plurality of arcuate portions disposed at a predetermined position on the annular armature plate. Also, second groove 26b of annular armature plate 26, third groove 600a of friction member 600, and projection 26d of annular armature plate 26, may be annular in shape or may be formed as a plurality of arcuate portions.

This invention has been described in detail in connection with the preferred embodiments, but the preferred embodiments are an example only and this invention is not restricted to the preferred embodiments. It will be easily understood by those skilled in the art that other variations and modifications can be easily made within the scope of this invention, which is defined by the appended claims.

I claim:

1. An electromagnetic clutch comprising:

a first rotatable member made of a magnetic material and including a first friction surface associated therewith;

a second rotatable member;

an annular armature plate made of a magnetic material and coupled to said second rotatable member so that said annular armature plate is capable of limited axial movement, said annular armature plate including a second friction surface associated therewith which faces said first friction surface with an axial air gap therebetween;

electromagnetic means associated with said first rotatable member and said annular armature plate for attracting said second friction surface to said first friction surface to transmit rotational force to said second rotatable member; and a friction member made of a nonmagnetic material and fixedly disposed on said second friction surface of said annular armature plate, said friction member having a first end surface which faces said first friction surface of said first rotatable member, said first rotatable member having a first annular groove formed in said first friction surface to receive said friction member, said first end surface of said friction member and said second friction surface of said annular armature plate being separated by a predetermined distance which allows said first end surface of said friction member to engage a bottom surface of said first annular groove.

2. The electromagnetic clutch in accordance with claim 1 wherein said friction member is annular in shape.

3. The electromagnetic clutch in accordance with claim 1 wherein said annular armature plate further comprises a second groove formed on said second friction surface to receive a part of said friction member to thereby fixedly dispose said friction member.

4. The electromagnetic clutch in accordance with claim 3 wherein said second groove is annular in shape.

5. The electromagnetic clutch in accordance with claim 4 wherein said friction member is annular in shape.

6. The electromagnetic clutch in accordance with claim 1 wherein said annular armature plate further comprises a projection formed at said second friction surface, and said friction member further comprises a third groove formed at a second end surface of said friction member to receive said projection to thereby fixedly dispose said friction member.

7. The electromagnetic clutch in accordance with claim 6 wherein said friction member is annular in shape.

8. The electromagnetic clutch in accordance with claim 7 wherein said third groove is annular in shape.

9. The electromagnetic clutch in accordance with claim 6 wherein said projection is annular in shape.

* * * * *